United States Patent [19]

Fetzer

[11] 4,026,201

[45] May 31, 1977

[54] CHARMARKER

[75] Inventor: Fred Fetzer, Strongsville, Ohio

[73] Assignee: Sam Stein Associates, Inc., Sandusky, Ohio

[22] Filed: June 10, 1976

[21] Appl. No.: 694,765

[52] U.S. Cl. .................................. 99/355; 99/483
[51] Int. Cl.² ........................................ A47J 37/00
[58] Field of Search ............ 99/388, 402, 446, 435, 99/483, 352, 355

[56] References Cited

UNITED STATES PATENTS

| 2,246,719 | 6/1941 | Burnham | 99/483 X |
| 2,483,669 | 10/1949 | Reid | 99/388 X |
| 3,721,178 | 3/1973 | Szabrak | 99/355 |

*Primary Examiner*—Edward J. McCarthy
*Attorney, Agent, or Firm*—Baldwin, Egan, Walling & Fetzer

[57] ABSTRACT

A char marker is presented for marking meat patties to simulate the marking normally produced when broiling a patty over charcoal on spaced bars which produce parallel charred dark stripes on the surface of the product. The char marker of this invention permits a plurality of hot marking rings each to independently follow its own rolling path over the product, thus compensating for the individual irregularities of the patties and producing superior and consistent markings.

7 Claims, 7 Drawing Figures

CHARMARKER

When precooking patties at a high production rate for the fast food field, or for TV dinners, it is often desirable to simulate the striped effect, called char marking, to improve the eye appeal of the patty by producing on the product the spaced parallel stripes which produce the appearance of the patty having been broiled over charcoal on spaced bars.

In producing this effect on meat patties there have been known arrangements which utilize a rolling heated drum with a series of projecting radial or peripheral fins which contact the surface of the product passing underneath the drum, so that the high temperature of the fins darkens the meat in stripes. One difficulty of this arrangement is that with multiple patties carried along a conveyor belt in difffernt conveyor lines, with the patties not always perfectly flat, the multiplicity of parallel peripheral rings or fins making contact with multiple patties at the same time, gives rise to the problem of uneven marking of the patties.

An object of the present invention is to provide a plurality of hot parallel rings rolling on a mandrel above the patties on a conveyor belt, each ring being allowed to independently follow its own rolling path, thus compensating for the irregularities of the individual patties and producing superior annd consistent marking.

Other objects and advantages of the invention will be apparent from the accompanying description and illustrations in the drawings and the essential features will be set forth in the appended claims.

In the drawings,

FIG. 6 is a view showing a heating device in position to heat the individual rings in the position on their supporting mandrel and showing means for swinging the mandrel assembly away from the burner; while

Figures 2, 3, 4, 5:
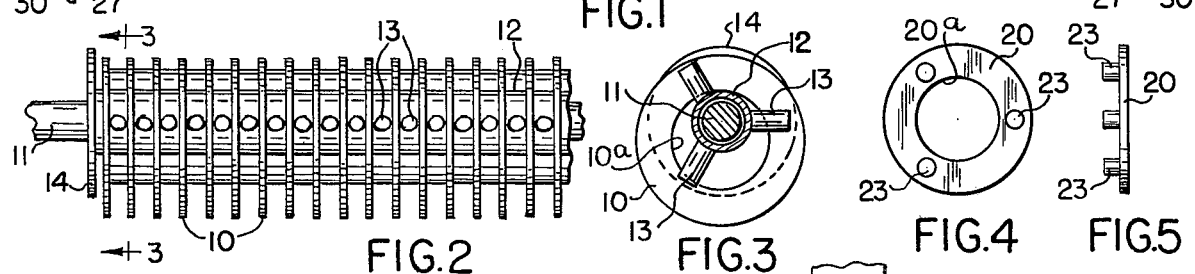
FIG. 2 is a partial elevational view of another embodiment of the invention.
FIG. 3 is a sectional view taken along the line 3—3 of FIG. 2.
FIGS. 4 and 5 are respectively elevational and end view of a marker ring used in FIG. 1 having spacer projections secured to each ring.
Figure 2A:
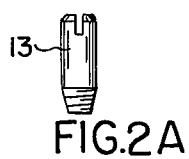
FIG. 2A is a spacer pin which is used in the embodiment shown in FIG. 2.

The apparatus shown in FIGS. 2, 2A and 3 comprises a plurality of marker rings 10, each ring having a central through opening 10a and these rings are all assembled on a supporting mandrel structure which in this embodiment involves a supporting shaft 11 passing through a marker support tube 12. Each end disk 22 is rigidly attached to tube 12 and has a central opening through which shaft 11 passes. Means is provided to support all of the rings in parallel evenly spaced relationship on the mandrel and in this embodiment this involves a plurality of spacer pins 13, clearly seen in FIGS. 3 and 2A. These pins are threaded into provided openings in the mandrel support tube 12 and they extend radially between each pair of rings extending outside of the through openings 10a as clearly seen in FIG. 3. A plurality of marking rings, in any number desired, are assembled on the mandrel and are held in their assembled position by end disks 14 fixed on the mandrel as seen in FIG. 2.

Figure 1:
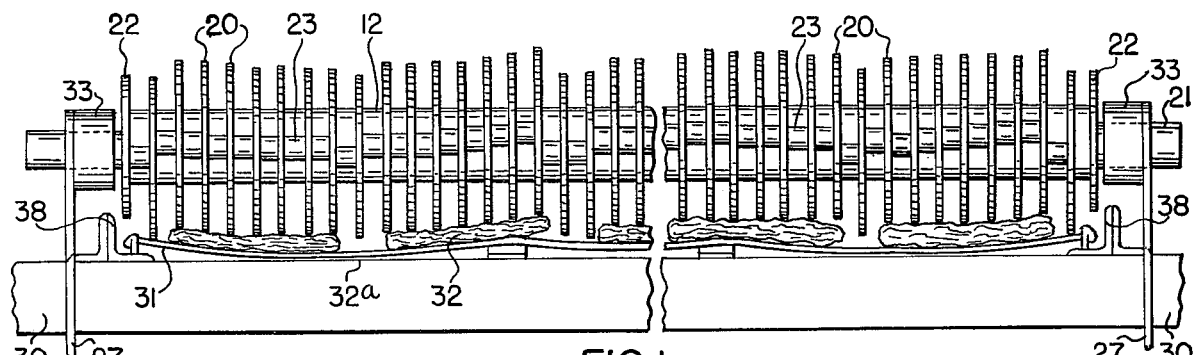
FIG. 1 is an elevational view of one embodiment of the invention showing the marking rings mounted on a supporting shaft and tube.

Another structure is shown in FIGS. 1, 4 and 5 wherein a plurality of marker rings 20, each having a concentric through opening 20a are assembled on a mandrel shaft 21 held in place by end support disks 22. The individual marker disks 20 are each individually supplied with projection spacer pieces 23 evenly spaced around each ring and permanently fixed in position, as by welding, as clearly seen in FIGS. 4 and 5.

Figure 6:
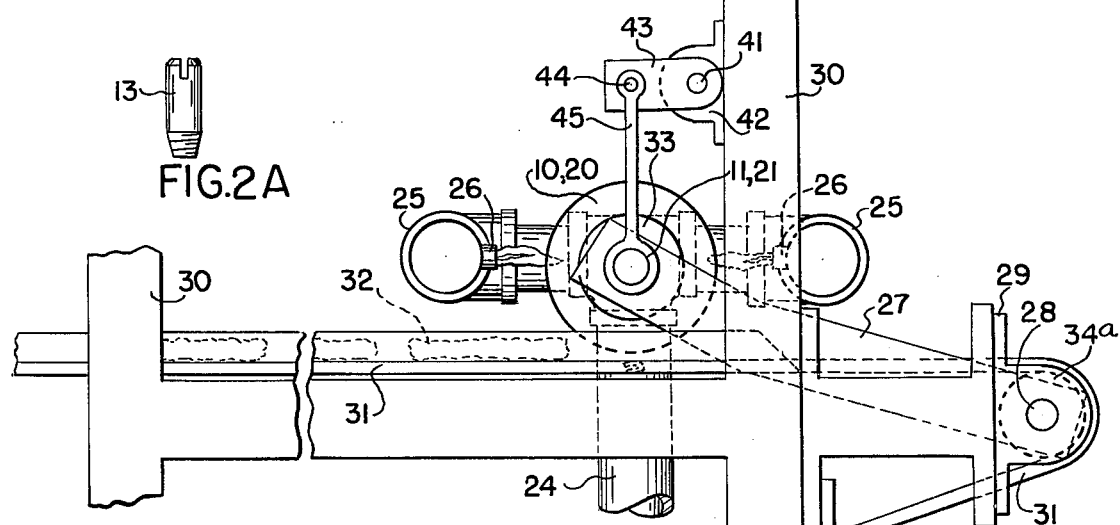
Figure 7:
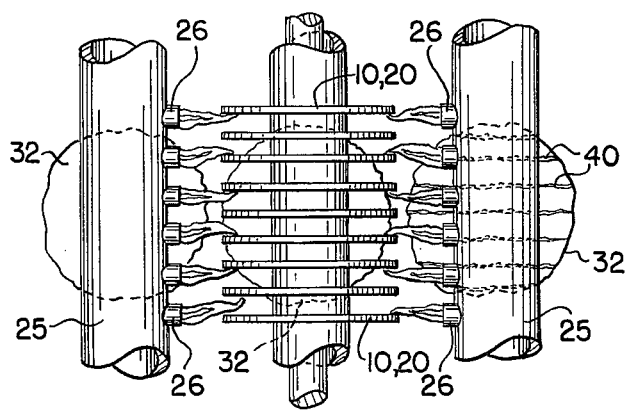
FIG. 7 is a top plan view of the heating device of FIG. 6.

Means is provided for heating each of the marker rings when in its operating position on the mandrel support. One such means is shown in FIGS. 6 and 7. Here a gas manifold 24 is connected to suitable piping 25 to tubes provided with a plurality of gas jets 26 so arranged as to impinge upon the periphery of all of the rings 10 or 20 mounted on the appropriate mandrel support. Thus, with the equipment in the position shown in FIGS. 6 and 7, the gas jets will be arranged to heat all of the marker rings to sufficient temperature to char the meat patties as they roll over the same as illustrated in FIG. 7.

The belt 31 passes over drive pulley 34a rotated by drive shaft 28, and then passes over idler pulley 34b on its supporting shaft 37. These pulleys are mounted on brackets 29 attached to the frame 30. The belt 31 carries the meat patties 32 beneath the marking device.

If desired, the assembly marker rings as shown in FIGS. 1 and 2 may be arranged to swing outwardly away from the product on the conveyor belt as shown in FIG. 6. In this construction, two parallel supporting arms 27 of equal length are each swingably mounted at one end pivoted on shaft 28. The opposite ends of the marker support shaft 11 or 21 are carried in bushings 33 in the free end of each of the support arms 27. Means is indicated in FIG. 6 for swinging the support arms 27 about the pivot points 28. A shaft 41 extending from end to end of the marker as seen in FIG. 1 is rotatably mounted in bearings 42 secured to the frame 30. At each end an arm 43 is fixed on shaft 41 so as to move by oscillation of such shaft. Each arm 43 carries a pivot pin 44 from which is suspended a link 45. Each link 45 is pivotally connected with the free end of one of the arms 27, in this case the links 45 rotatably support the opposite ends of shaft 11 or 21. Thus, clockwise rotation of the shaft 41 by means not shown will raise the shaft 11 or 21 out of its operating position. Such shaft rotation may be by means of a crank arm located out of the heated area.

It will be understood that the use of this invention generally involves the production of a large number of meat patties wherein the patties 32 are carried by the conveyor belt 31 in a plurality of rows 32a across the width of the conveyor belt 31 as shown in FIG. 1. The conveyor belt is mounted between the guides 38 carried on the frame 30 as seen in FIG. 1.

It will be noted that the marker rings as shown in FIGS. 1 and 2 will move up and down within the limits of the through openings 10a or 20a which are of such a size as to permit each ring in a lower position relative to the supporting mandrel, to rest upon and roll over a meat patty 32 and each of the rings is independently movable restricted only by the shape of the patty passing beneath the ring as seen in FIG. 1.

When the marker rings are kept sufficiently heated, as shown in FIGS. 6 and 7, the patties 32 traveling from left to right as seen in FIG. 6 pass beneath the marker rings 10 or 20 and exit at the right-hand side of FIG. 6 clearly and consistently marked with spaced parallel charred markings as indicated at 40 in FIG. 7.

What is claimed is:

1. A char marker for marking meat patties comprising a cylindrical mandrel, means for supporting opposite ends of said mandrel above and parallel to a meat patty conveyor, a plurality of uniform marker rings, each ring having a concentric through opening greater in diameter than said mandrel, said rings mounted with said mandrel passing through said openings, means supporting said rings in parallel evenly spaced relationship on said mandrel, said through openings being of uniform diameter and of a size to permit each ring in a lower position relative to said mandrel to rest upon and roll over a meat patty, and means for heating each of said rings when in said position on said mandrel.

2. A char marker for marking meat patties as defined in claim 1, wherein said means supporting said rings in parallel evenly spaced relationship comprises spacer pieces fixed on one face of each ring extending toward an adjacent ring, and means confining all of said rings in a predetermined space on said mandrel.

3. A char marker for marking meat patties as defined in claim 1, wherein said mandrel includes a fixed central shaft, a support tube concentric about said shaft, and spacer pins mounted in parallel spaced plan as in said tube, said pins extending radially between said rings outside said through openings.

4. A char marker for marking meat patties as defined in claim 1, including a frame supporting said conveyor, two supporting arms of equal length, one at each end of said mandrel, said means for supporting said mandrel mounted respectively in one end of said arms, and pivot members on said frame supporting the other end of each arm respectively there.

5. A char marker as defined in claim 4, including means for swinging said arms about said ends mounted in said pivot members.

6. A char marker for marking meat patties as defined in claim 1, including a frame supporting said conveyor, and said heating means is supported in fixed position on said frame closely adjacent the periphery of said rings.

7. A char marker as defined in claim 6, wherein said heating means includes gas jets impinging upon each of said rings.

* * * * *